(12) United States Patent
Feray et al.

(10) Patent No.: US 6,381,653 B1
(45) Date of Patent: Apr. 30, 2002

(54) MANAGING ACCIDENTAL DEATH OF AN OBJECT DURING COMMUNICATION BETWEEN OBJECTS DISTRIBUTED IN A COM ENVIRONMENT

(75) Inventors: Alexandre Feray, Paris; Philippe Mougin, Sainte Tulle, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/060,817

(22) Filed: Apr. 16, 1998

(30) Foreign Application Priority Data

Apr. 17, 1997 (FR) ............................................ 97 04743

(51) Int. Cl.⁷ ................................................ G06F 9/54
(52) U.S. Cl. ...................................................... 709/315
(58) Field of Search .............................. 709/303, 315, 709/316

(56) References Cited

FOREIGN PATENT DOCUMENTS

GB          2305271 A      4/1997

OTHER PUBLICATIONS

Chappell, David. "Understanding ActiveX and OLE, A Guide for Developers & Managers". Microsoft Press, Chapters 2 and 10, Sep. 1996.*
(Chappell,1) Chappell, David. "Understanding ActiveX and OLE". pp. 56–64, Sep. 1996.*
(Chappell,2) Chappell, David. "The Joy of Reference Counting" p. 1–6, Aug. 1997.*
(CORBA) . CORBAservices, Chapter 6, "LifeCycle Service Specification", Sep. 1996.*
(Chappell) Chappell, David. "Understanding ActiveX and OLE" Microsoft Press, Sep. 1996.*
Microsoft Corporation "The Component Object Model Specification", Mar. 1995.*
S. Williams et al, "The Component Object Model—the Foundation for OLE services", Dr. Dobb's Special Report, Winter 1994/95, pp. 14–22.

* cited by examiner

*Primary Examiner*—St. John Courtenay, III
*Assistant Examiner*—Lewis A. Bullock, Jr.
(74) *Attorney, Agent, or Firm*—Sughrue Mion, PLLC

(57) ABSTRACT

A method in a COM environment enables a first object (X) to be informed of an accidental death of one or more second objects (Y). When the first object (X) opens communications with one of the second objects (Y), the first object (X) creates an intermediate object (W) and sends a message having a reference to the intermediate object (W) to the corresponding second object. When the message has been received, the second object calls the COM "AddRef" function using the reference to the intermediate object (W) as a calling parameter. If a second object accidentally dies, COM calls the "Release" function to release the corresponding intermediate object, which sends a message (D) to the first object (X) informing the first object (X) of the accidental death of the particular second object. The first object (X) creates an intermediate object (W) for each second object (Y) so that the first object can be informed of the accidental death of each respective second object.

4 Claims, 2 Drawing Sheets

MANAGING ACCIDENTAL DEATH OF AN OBJECT DURING COMMUNICATION BETWEEN OBJECTS DISTRIBUTED IN A COM ENVIRONMENT

FIELD OF THE INVENTION

The present invention relates to a method making it possible for an object, which has opened up communication with another object, to be informed of accidental death of the other object. The invention is applicable to an object environment using Microsoft Corporation COM technology.

BACKGROUND OF THE INVENTION

The present invention is particularly applicable to the field of systems for supervising industrial processes. Conventionally, such a system acquires data in real time from various supervised items of equipment, and it presents information relating to said equipment on one or more terminals. Among other constraints, it is essential for the displayed information to be pertinent so that the operator in charge of monitoring the industrial process is able to make a good diagnosis of the state of the process.

Thus, when a connection between an item of equipment and the supervisory system is interrupted as a result of any kind of failure, the system must inform the operator within as short a lapse of time as possible.

Certain recent supervisory systems implement object-oriented architectures suitable for being distributed over a plurality of execution units. FIG. 1 shows a typical architecture of a supervisory system. An item of equipment E is supervised by an object $O_1$ placed in an execution unit $U_1$ situated on the same site as the equipment. The object $O_1$ communicates by means of a network with an object $O_2$ placed in an execution unit $U_2$ situated on a remote site and whose purpose is to perform processing, in particular to display information intended for an operator.

In order to help to develop such object-oriented and distributed applications, various tools exist that are referred to under the general abbreviation DPE (for Distributed Processing Environment). The aim of DPEs is to free the developer from managing the locating of objects in a distributed architecture and from managing communications between said objects.

Two large families of DPE exist: one is based on the OMG (Open Management Group) specification and is referred to as CORBA (Common Object Request Broker Architecture), and the other is built around the COM (Component Object Model) product designed by the Microsoft Corporation.

In its first version, COM managed the distribution of the objects over a set of processes situated on a single execution unit only (e.g. on a single computer). A second version, referred to as DCOM (Distributed Component Object Model) makes it possible to obtain a second level of distribution by managing the distribution of the objects within a plurality of execution units.

The present invention applies both to COM and to DCOM so that, in the remainder of the description, reference is made to the acronym COM only to cover both versions.

FIG. 2 shows the mechanism offered by COM for managing accidental death of an object. As explained below, that mechanism is insufficient in many cases.

Each time that a client object X opens up communication with a server object Y, it calls on a specific function offered by COM, referred to as "AddRef", and whose purpose is to increment a counter associated with the server object Y. On normal ending of the communication, the client server Y calls on another function offered by COM, referred to as "Release", and whose purpose is to decrement the same counter. When the counter is equal to zero, that means that there is no longer any communication open to the server object Y; in other words, no client object requires the services of the server object Y. It is thus possible to release the resources occupied by the server object Y.

When the client object X dies accidentally, it can no longer call on the "Release" function to decrement the counter associated with the server object. However, the COM infrastructure detects accidental death of the client object X and takes care of calling on the "Release" function so as to guarantee that the value of the counter is pertinent.

For more information on the mechanisms specific to COM, reference may be made to the document entitled "The Component Object Model Specification" published by Microsoft Corporation. That document is available from Microsoft Corp., in particular on the Internet site whose address is as follows:

http://www.microsoft.com/oledev/olecom/title.html

Reference may also be made to the rather didactic document by Sara Williams and Charlie Kindel, "The Component Object Model—The Foundation for OLE Services", published in Dr Dobb's Special Report, winter 1994/95, vol. 14, No. 16, pages 14 to 22.

As mentioned above, that mechanism is insufficient because it does not enable the client object X to be informed of accidental death of the server object Y. In fact, the relationship between the objects is the opposite of what it needs to be.

In addition, when an object is in communication with a plurality of other objects, COM calling on the "Release" function in the event of accidental death of one of the objects does not enable the object to know which of the other objects has accidentally died. The only information supplied is that one object among the set of server objects has just died.

OBJECTS AND SUMMARY OF THE INVENTION

As mentioned above, there is a problem in a supervisory system because the displayed information is no longer up to date, while the operator has not been informed that this is the case, but that insufficiency has repercussions on other technical fields, such as, for example, network management. Therefore, the invention is not to be understood as limiting itself to the field of industrial process supervision. On the contrary, the scope of the present invention is very general, and an aim of the present invention is to propose a method enabling any first object that has opened communication with a second object to be informed in the event of accidental death of said second object.

In the method of the invention:
  said first object creates an intermediate object and sends a message containing a reference of said intermediate object to said second object; and
  said second object calls on an "AddRef" method offered by COM, with a reference of said intermediate object (W) as a parameter;
  if the second object incurs accidental death, COM calls on a "Release" method for releasing said intermediate object, said intermediate object sends a message to said first object informing it of the accidental death of said second object.

BRIEF DESCRIPTION OF THE DRAWINGS

The characteristics and advantages of the present invention appear more clearly from the following description given with reference to the accompanying figures, in which.

DETAILED DESCRIPTION

In accordance with the invention, when a supervising object wishes to be informed of accidental death of a supervised object, it firstly creates an intermediate object. It then sends a message M containing a reference of the intermediate object to the supervised object. The intermediate object is specific to a single relationship between two objects. Thus, if the supervising object needs to be informed of accidental death of a plurality of supervised objects, it is necessary for said supervising object to create as many intermediate objects as there are supervised objects.

Figure 1:
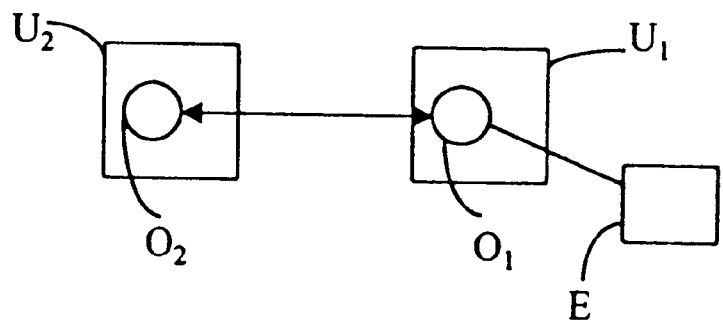
FIG. 1 shows the general architecture of one application of the present invention.
Figure 2:
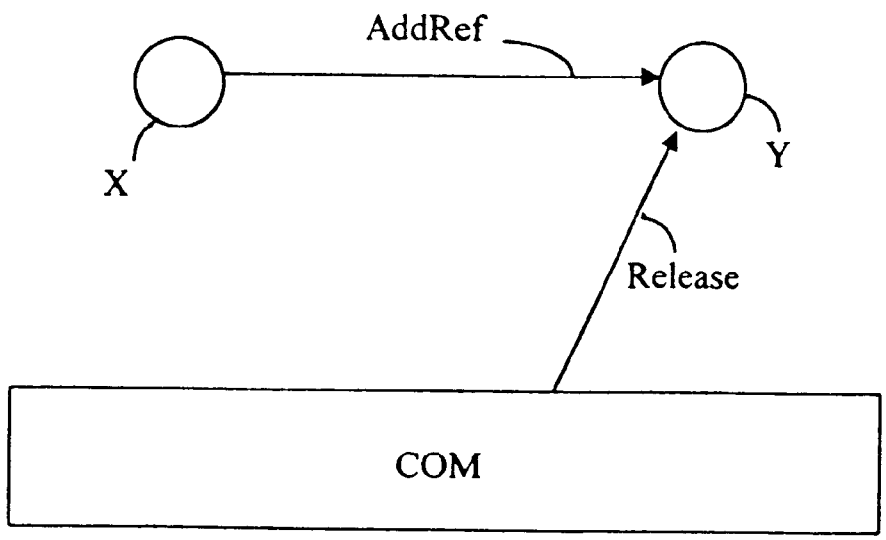
FIG. 2 shows the basic mechanism offered by COM.
Figure 3:
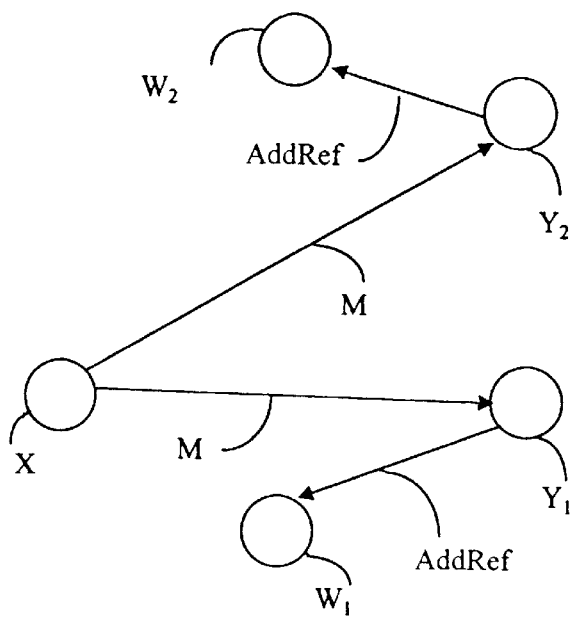
FIG. 3 shows an example of the initialization stage of the invention, whereby communication between objects is initialized.

For example, in FIG. 3, the supervising object X wishes to be informed of accidental death of the two supervised objects $Y_1$ and $Y_2$. For this purpose, it creates two intermediate objects $W_1$ and $W_2$. It then sends a respective message to each of the two supervised objects, containing the reference of the corresponding intermediate object ($W_1$ for $Y_1$ and $W_2$ for $Y_2$).

In response to this message, each supervised object ($Y_1$ or $Y_2$) calls on the "AddRef" function with, as the parameter, a reference of the intermediate object (respectively $W_1$ or $W_2$) which is associated with it (i.e. whose reference it has received in the message M sent by the supervising object). In this way, each intermediate object ($W_1$, $W_2$) becomes the sole server of a single client object (respectively $Y_1$, $Y_2$), and the relationship induced by COM is inverted and made to match requirements.

Figure 4:
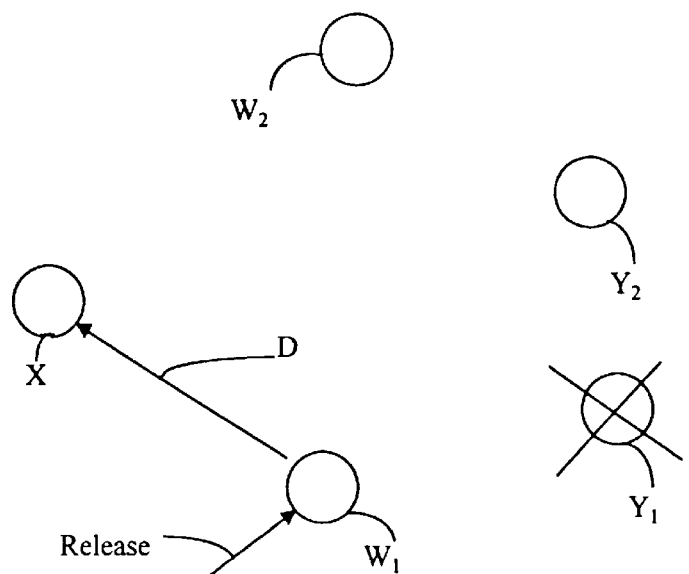
FIG. 4 shows an exemplary mechanism of the invention in the event of accidental death of a supervised object.

On accidental death of a supervised object, e.g. $Y_1$, as shown in FIG. 4, the COM system informs the associated intermediate object ($W_1$) of said death by calling on the "Release" function. Since the intermediate object has only one associated supervised object, the ambiguity inherent to the semantics of COM is removed. The intermediate object is thus able to send a message D containing a reference of the supervised object ($Y_1$) that has just died accidentally to its associated supervising object (X).

What is claimed is:

1. A method enabling a first object (X) to be informed in the event of accidental death of a second object (Y), in a COM environment, comprising the steps of:

when said first object (X) opens communication with said second object (Y), (a1) said first object (X) creates an intermediate object (W) and sends a message (M) containing a reference of said intermediate object (W) to said second object (Y), and (a2) said second object (Y) then calls on an "AddRef" method using a reference of said intermediate object (W), which is associated with said second object (Y), as a parameter;

and, if said second object (Y) incurs accidental death, (b1) COM calls on a "Release" method for releasing said intermediate object (W), and (b2) said intermediate object (W) sends a message (D) to said first object (X) informing said first object (X) of the accidental death of said second object (Y).

2. A method enabling a first object (X) to be informed in the event of accidental death of any of a plurality of second objects (Y), in a COM environment, comprising the steps of:

when said first object (X) opens communication with an object ($Y_n$) of said plurality of second objects, (a1) said first object (X) creates an intermediate object ($W_n$) and sends a message ($M_n$) containing a reference of said intermediate object ($W_n$) to said second object ($Y_n$), and (a2) in response to the message ($M_n$), said second object ($Y_n$) calls on an "AddRef" method using a reference of said intermediate object ($W_n$), which is only associated with said second object ($Y_n$), as a parameter;

and, if said second object (Yn) incurs accidental death, (b1) COM calls on a "Release" method for releasing said intermediate object ($W_n$), and (b2) said intermediate object ($W_n$) sends a message ($D_n$) to said first object (X) informing said first object (X) of the accidental death of said second object ($Y_n$).

3. A method for Component Object Model (COM) management of accidental death of an object, comprising the steps of:

having a first object create an intermediate object when opening communication with a second object, wherein said intermediate object is associated with said second object in a one-to-one relationship and said second object receives a parameter of said first object in a message send from said first object; and, in the event of an accidental death of the second object, having COM release the intermediate object in order to have the intermediate object send a message to the first object, thereby informing the first object of accidental death of the second object, wherein said message includes a reference to said second object.

4. A computer system adapted to manage an accidental death of an object, comprising:

a processor, and a memory including software instructions adapted to enable the computer system to perform the steps of:

having a first object create an intermediate object when opening communication with a second object, wherein said intermediate object is associated with said second object in a one-to-one relationship and said second object receives a parameter of said first object in a message send from said first object; and, in the event of an accidental death of the second object, having COM release the intermediate object in order to have the intermediate object send a message to the first object, thereby informing the first object of accidental death of the second object, wherein said message includes a reference to said second object.

* * * * *